United States Patent [19]

Bieganski

[11] Patent Number: 5,009,130
[45] Date of Patent: Apr. 23, 1991

[54] COAXIAL CABLE STRIPPER

[76] Inventor: Zdzislaw Bieganski, "Brushwood", Kinsbourne Green, Harpenden, Hertfordshire, United Kingdom

[21] Appl. No.: 449,993

[22] Filed: Dec. 13, 1989

[30] Foreign Application Priority Data

Dec. 22, 1988 [GB] United Kingdom ............... 8829895

[51] Int. Cl.⁵ .............................................. H02G 1/12
[52] U.S. Cl. ........................................ 81/9.4; 30/90.1
[58] Field of Search ...................... 81/9.4, 9.44, 951; 30/90.1, 91.1, 91.2, 90.6

[56] References Cited
FOREIGN PATENT DOCUMENTS
0750626 7/1980 U.S.S.R. .................. 81/9.4

Primary Examiner—Frederick R. Schmidt
Assistant Examiner—Lawrence Cruz
Attorney, Agent, or Firm—Learman & McCulloch

[57] ABSTRACT

A tool for stripping the insulation and screen layers from a coaxial cable has a body in which a plurality of spaced blades is supported by a carrier that is movable toward and away from a cable that may be located in a position to be engaged by the blades. A pawl and ratchet latching device holds the blade carrier in stripping position, but is releasable to enable the carrier to be moved to a position in which cables can be fitted to and removed from the tool. The blade carrier also is movable to an extreme position in which one set of blades may be replaced by another.

14 Claims, 4 Drawing Sheets

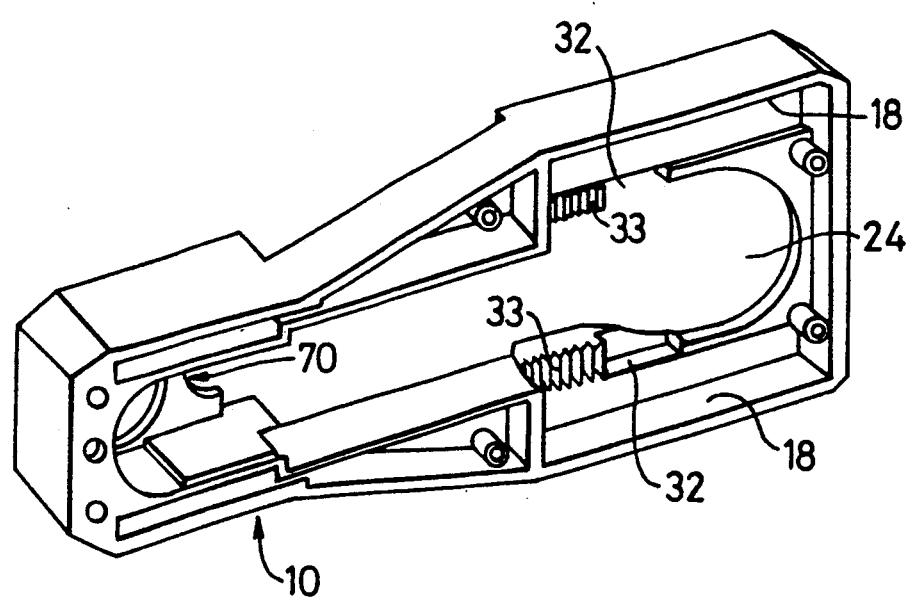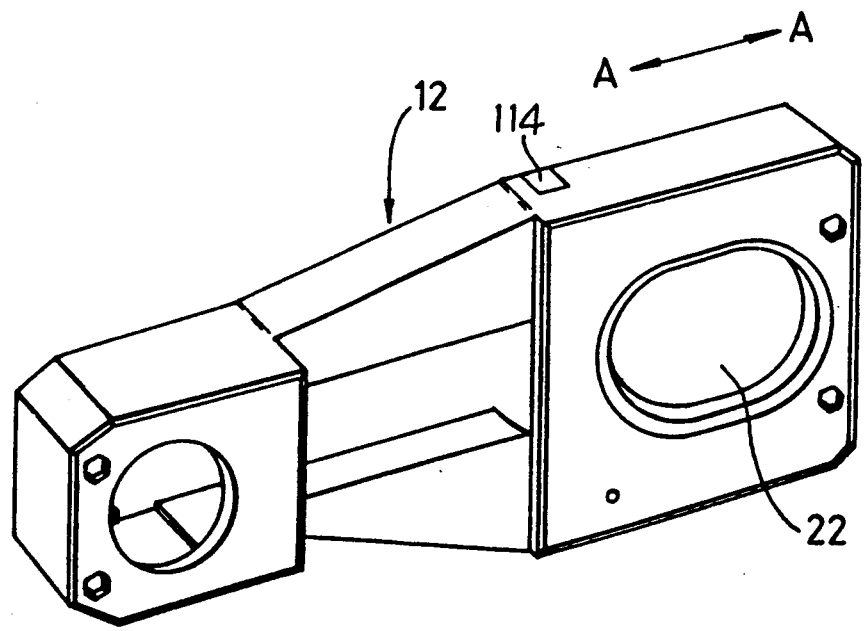
Fig. 5

COAXIAL CABLE STRIPPER

This invention relates to tools for stripping the sheathing from the successive layers of a coaxial cable for the purpose of attachment of terminals. EP 0 018 158 proposes a tool for this purpose having a body, a blade carrier movable relative to the body, and three separate blades each associated with a separate aperture in the body. The carrier is spring urged in a direction to take the blades across the apertures, and individual adjusters enable the extent of spring driven overlap of blades and apertures to be varied. Each blade is connected to its adjuster by a headed pin and a T slot. The tool is used by retracting the carrier against the springs, inserting a cable into a first aperture until a point on the outer sheath, where the sheath is to be cut, is positioned opposite the first blade, and allowing the springs to drive that blade to cut into the sheath. The tool and cable are then relatively rotated and the cable is pulled out thus stripping off the end portion of that outer sheath. The cable is then inserted at a different axial point in the second aperture and the operation repeated to leave a bared portion of the screen, and then for a third time at yet another point to strip off the inner insulation leaving the bared core.

The operation with the tool of the said EP thus involves the three blades being set to appropriate projections, corresponding to the required cable parameters, and the cable being positioned relative to the tool at axially appropriate points suitable to the particular terminal. There are very many different sizes of cable in existence and very many different terminals. The tool is versatile and can be accommodated to suit many or even all of the variables, but setting up time, which usually means making empiric adjustments, can be long and wasteful of cable, and because there is no satisfactory control of the actual spacing of the cuts, a high degree of user skill is necessary in order to provide completely satisfactory results.

The object of the invention is to provide an improved tool which can be "dedicated" that is to say made suitable for a particular combination of cable and terminal so as to give easily repeatable results with only a low degree of user skill: and which can be converted to a different cable and/or terminal in a simple manner.

According to the invention, a tool of the kind comprising a body, a blade carrier which is arranged for movement relative to the body, and three separate blades mounted on the blade carrier projecting for different distances, is characterised in that the blades lie in parallel planes separated by spacers which are also mounted on the carrier, whereby all of the blades can cut into the cable substantially simultaneously and the axial separation is dictated by the width of the separators.

An important feature of the invention is the provision of catch means to hold the blade carrier in a part or wholly retracted position so that the cable can be inserted into the tool. When the catch is released, the blade may be spring driven into the cable.

An important feature of the invention is a ratchet action on the blade carrier. This is to be effective over the final part of the travel of the blade carrier in its movement towards the cable, when manual input may be necessary in order to ensure that the blades cut into the cable sheath. If spring action is relied upon for this, the springs need to be strong, which makes the carrier difficult to retract. The spring action preferred in the present invention is one which is sufficient to drive the blade carrier towards the cable and perhaps allow the blades to cut into the soft outer sheath of the cable, but insufficient for example to cut through the metal screen usually provided as one of the layers of a coaxial cable. To cut into and through such layers, manual input can be applied to displace the blade carrier. The advantage of the ratchet is that it effectively fixes the carrier in a position relative to the cable axis after the manual displacement and prevents the carrier being displaced in a return movement.

A further important aspect of the use of the ratchet is that it can be arranged to give an audible indication of the extent of travel of the blade carrier. Thus, the ratchet tooth can cause an audible click. When this has occurred, and by rotating the tool about the cable the user can be sure that the cuts are complete and sufficient. However, it will often be necessary to rotate the tool, advance the cutters and repeat the rotation and so on, when the cut is to be effected in a series of stages.

Preferably the blade carrier is made detachable from the means which spring urge it into the operating position, and removal of the blade carrier—for example for replacement by a different one—can only be effected by moving the blade carrier beyond a halfway retracted and catch engaged position. Hence in ordinary use of the tool in any one dedicated version, that is to say carrying out a predetermined pattern of cuts on a particular cable, the operator will never displace the blade carrier to the position in which it can be removed.

According to another important feature of the invention, the means for displacing the blade carrier may be connected to the carrier by a locked screw adjuster. This can be arranged, using blades which project for known distances pre-assembled into blade carriers of known dimensions so that the tool can be set up in manufacture and will not normally require any adjustment by the user even when the blade carrier is interchanged for a different blade carrier for use with different cables. The adjustment will be available for use in the possibly rare occasions when cable varies from its specification in one or more parameters, in order to make good cuts even in such situations.

As mentioned, it is preferred to use springs to drive the blades towards the cable. These springs may be duplicated and possibly arranged with lost motion or limited effective range for ones of the springs, so that the spring driven movement is greatest from the fully retracted position of the blade carrier and least over the final part of the range of movement. The greatest spring pressure may be used to displace the carrier from the position necessary for blade carrier interchange, effectively making it more difficult to move the carrier to the interchange position but thus reducing the risk of the carrier being disconnected in ordinary use.

A useful feature of the spring arrangement as mentioned is that they are at their least effective over the range of movement controlled by the ratchet. The natural resilience of the cable and the forces applied to the cutter blades in operation tend to displace the blades away from the cable axis and this movement is resisted by the ratchet. The springs are to displace the carrier in the opposite direction. If the spring pressure is high in the ratchet control position, it would tend to lead to a small uncertainty of position as between one ratchet tooth and the next. By making the spring pressure practically ineffective, the ratchet position and hence the depth of cut is controlled more closely and with greater certainty.

The invention is now more particularly described with reference to the accompanying drawings in which:

FIG. 5 is an exploded perspective view showing the two body parts of the tool shown in FIGS. 1 to 3;

Figure 1:
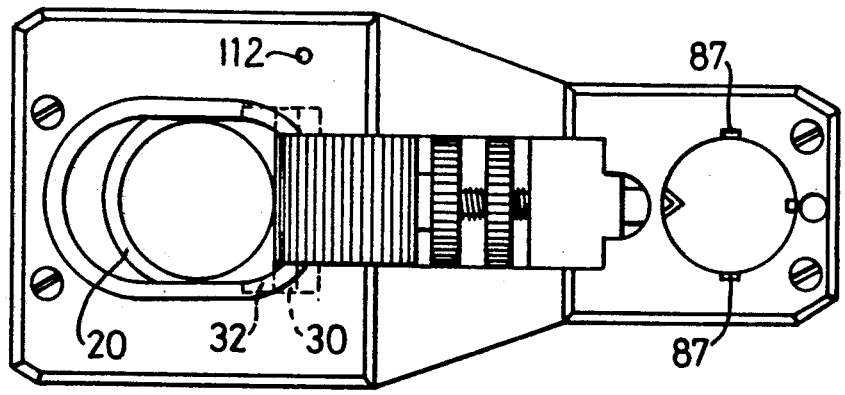
FIG. 1 is a plan view with one part removed, but otherwise showing the tool in a position ready to receive a cable and perform a stripping operation.
Figure 2:
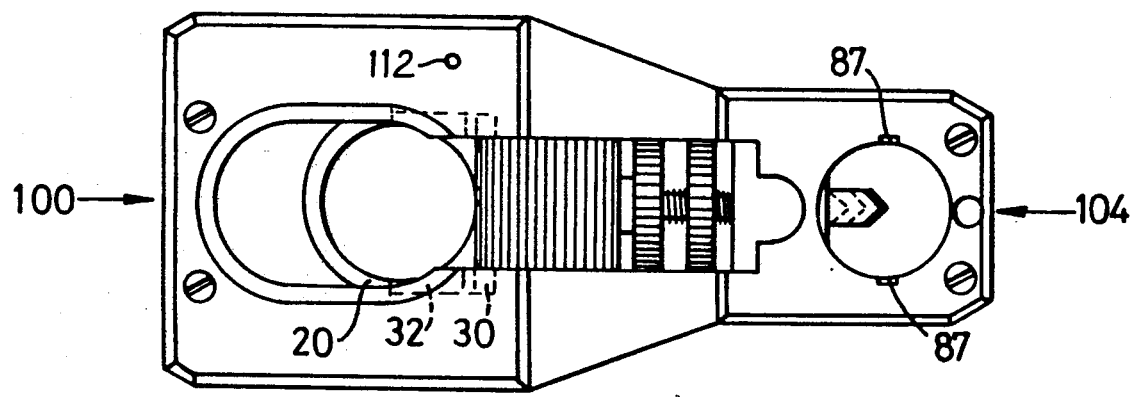
FIG. 2 is a view similar to FIG. 1 but showing the cutter blades in the course of that stripping opeation.
Figure 3:
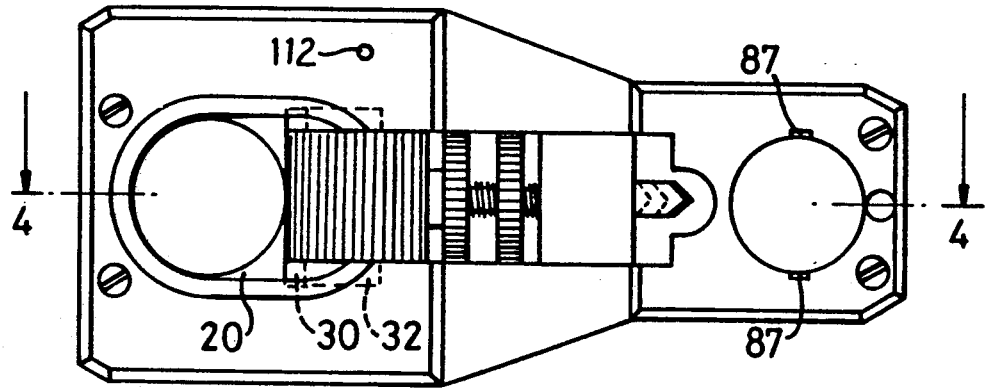
FIG. 3 is a further view similar to FIGS. 1 and 2 but showing the parts in the position ready for cutter interchange.
Figure 4:
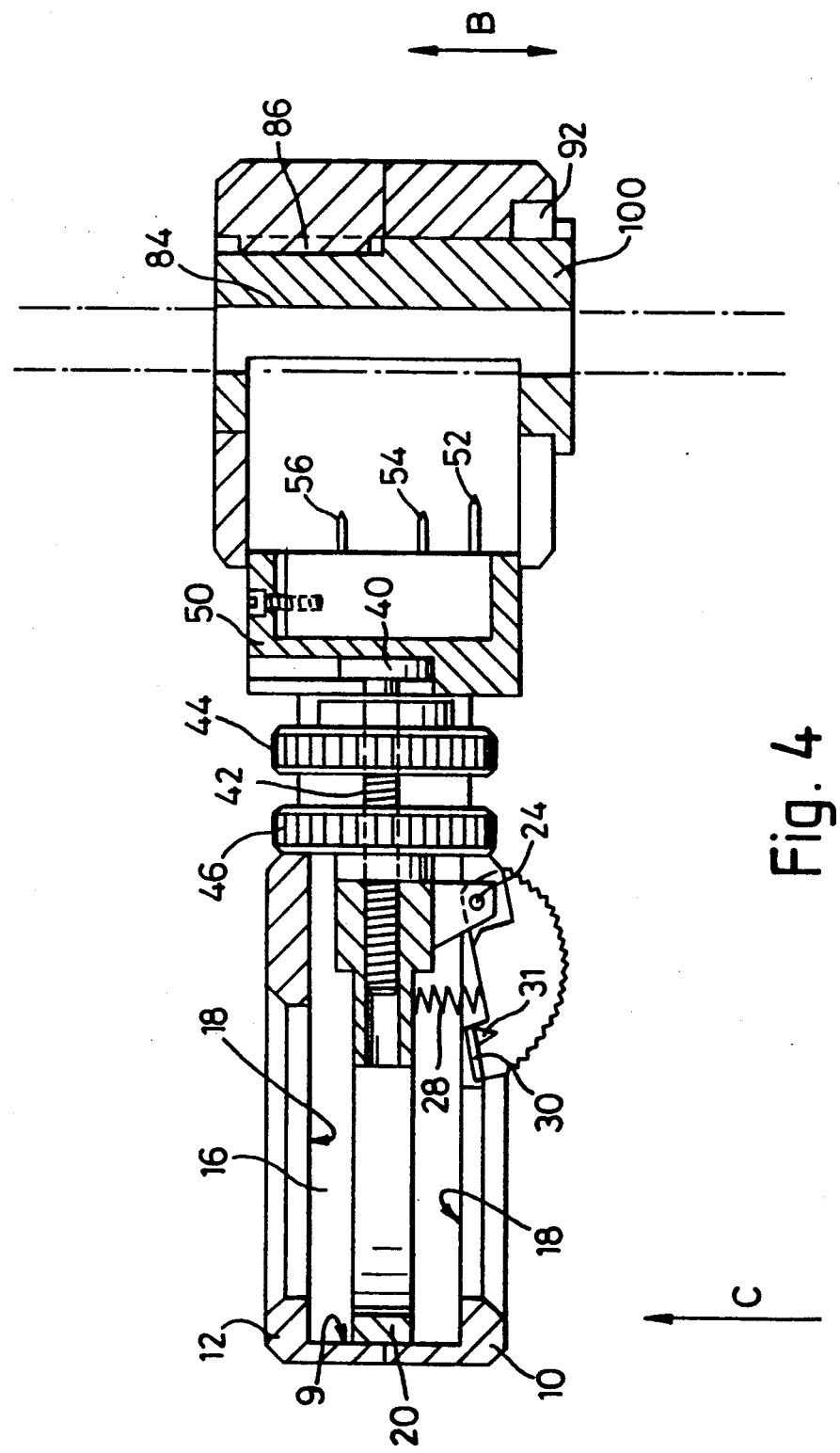
FIG. 4 is a section taken on the line 4—4 of FIG. 3 but also showing the part omitted from FIGS. 1 to 3.

The tool shown in the drawings comprises a pair of body parts 10 12 (FIG. 5) which fit together as generally seen in FIG. 4. Received between them and generally in sliding engagement therewith is an actuator 14 (FIG. 6) which comprises a pair of side flanges 16 which run in guideways 18 formed in the body parts. The guideways are longer than the flanges to allow a limited movement in the direction of the arrows A FIG. 5. Between the two flanges is an integral ring 20 which is accessible through a main large elongated opening or aperture 22 in the body part 12 and similarly shaped end portion 24 of a longer aperture in the body part 10. As best seen in FIGS. 1 to 3 the ring can be withdrawn wholly to the left in FIG. 3 to a blade interchange position, can be withdrawn to a halfway or intermediate position for normal use in cable stripping as seen in FIG. 1, or released for actual cutting and stripping operation to the position shown in FIG. 2.

The actuator 14 carries a hinge pin 25 for catch part 26 and a compression biasing spring 28 (FIG. 4) trapped between the catch and the ring urges the catch counter-clockwise as seen in the figures. The catch is provided with a pair of transversely diametrically projecting latching lugs 30, having pawl formations 31 and the body part 10 is provided on the inside face with a pair of complementary located recesses 32 to receive the lugs 30 in one of the possible displaced positions of the actuator along the length of the tool body. Adjacent to the recesses are one or more ratchet teeth 33 which may include latching or holding surfaces which are normal to the line between the arrows A—A connected by inclined surfaces.

Figure 8:
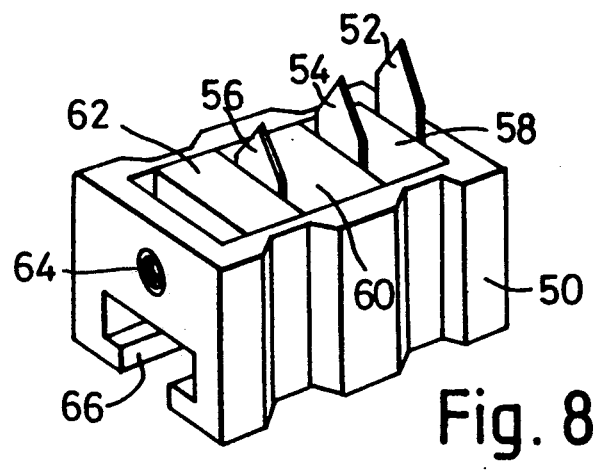
FIG. 8 is a perspective view of one blade carrier.

The blade carrier (FIG. 8) is connected to the actuator by a Tee slot 66 in the carrier engaging a head 40 on an end of a screw 42 engaged with the actuator. The screw engages milled adjuster wheel 44 and a second milled lock nut 46. By these means the axial position of the head 40 relative to length of the body part can be adjusted and set.

The blade carrier (FIG. 8) comprises a box 50 carrying the required number of blades 52 54 56 separated by spacer blocks 58 60 62 with the whole assembly clamped by an end screw 64. The height of the blades, that is their projection above the box is selected to suit a particular specification of cable, for the height corresponds to the thickness of the respective layers which are to be cut through in preparing a termination. The separation, that is the width of the spacers, depends upon the particular terminal which is to be connected. Hence each box is dedicated to a particular cable/terminal combination or possibly to several different cables and/or terminals having common dimensions. By inserting any one box and then making trial cuts on the corresponding cable, the milled wheels 42 46 can be adjusted so as to give a perfect cut through the successive layers of that cable, and it will be unnecessary to disturb the settings of the wheels 42 46 when interchanging with a different box to suit a different cable/terminal combination.

Figure 6:
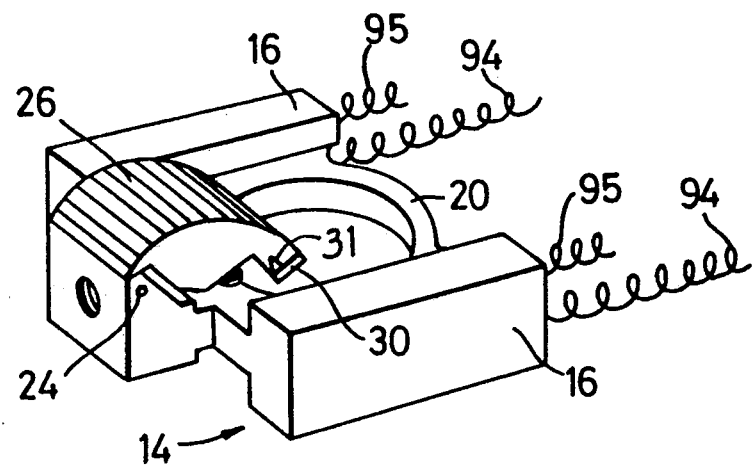
FIG. 6 is a perspective view of the actuator forming part of the tool shown in the figures.

It will be appreciated that the box is inserted into the tool to engage the head 40 with the Tee slot 66 by a movement of the box in the direction of the arrows B FIG. 4. This movement is only possible through the end 70 of the aperture 24 in part 10 (FIG. 5) because the required clearance is not provided in the corresponding aperture in the part 12. FIG. 3 shows the box in the extreme position ready for interchange. In this position the spring pressure is maximal. For convenience in box interchange aligned detent holes 112 are provided in both body parts, located so that when the ring is wholly withdrawn (FIG. 3) a pin such as a screw-driver shaft can be passed through those holes and act as a detent adjacent end face 14 (FIG. 6). The box itself can only be inserted in one direction because the Tee slot in it is blind ended.

Figure 7:
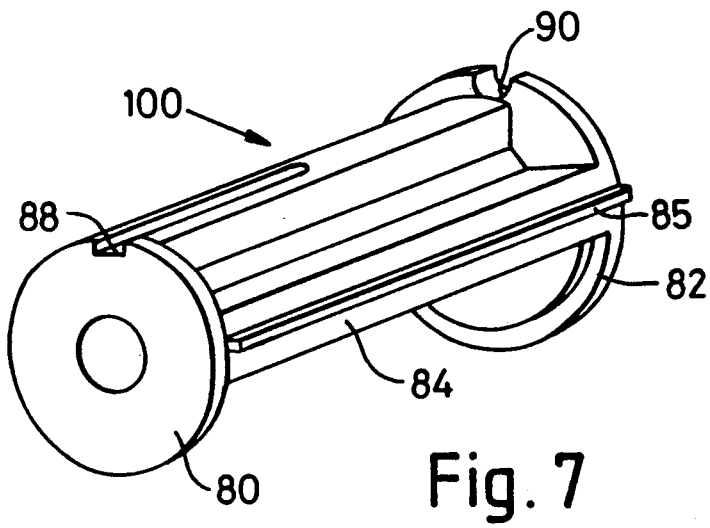
FIG. 7 is a perspective view of one cable guide.

The cable guide 100 itself is shown in FIG. 7. Essentially this consists of end cheeks 80 82 which are apertured to correspond with the appropriate cable diameter. Hence the cable guide is to be interchanged when the tool is to be dedicated to a different cable size. The cable is supported along its length between the end cheeks by a part 84 which is generally semi-circular. The flanges 80 82 are registered in angular position relative to the tool by cooperation between the key 86 formed in one of the body parts (FIG. 4) and keyway 88 in the cable guide and by ribs 85 which are diametrically located on the guide and engaged in grooves 87. This ensures that the cable support part 84 is on the opposite side of the cable from the cutters. The cable guide is also inserted from one position only by virtue of the key in the body preventing the guide being inserted at the opposite end.

Flange 82 is cutaway at the position 90 to clear a hole 92 provided in the one body part and which is intended to receive a cable stop which can be inserted in aperture 92 and extend across the bore through the cable guide at a position removed from the tool, so that when the termination is to be effected at a particular axial location along the length of the cable, such a stop can be used for the purpose. The stops will be interchangeable to provide different positions.

The actuator is driven along the length of the body by at least a pair of compression springs 94 received in bores in the flanges 16 (FIG. 6): preferably the compression springs are duplicated at each side, using a long spring and a short spring which extends between first abutment on the inside end face 9 of the body parts and a second abutment in the side flanges 16 (FIG. 6). The shorter springs 95 only abut the end face 9 when the actuator is withdrawn beyond the FIG. 1 position towards the FIG. 3 position, as is necessary for interchange of parts to render the tool suitable for use with a different combination of cable and terminal, so that the shorter springs act to prevent unintentional withdrawal towards such position. The springs 94 are not to be so strong that in movement from the FIG. 2 position to the FIG. 1 position, in retracting the blades ready for a repeat operation, great physical force is necessary. Such movement is efffected by the user inserting a finger through the ring 20 in the FIG. 2 position, with for example the user's thumb contacting the end of the body at the position 100, and squeezing the finger and thumb together. The catch lugs 30 will automatically engage in the recesses to hold the parts in the FIG. 1 position as the movement progresses. The cable is then inserted, for example to be flush with the flange 82 or to abut a stop axially spaced from that flange, and then the catch is depressed against its spring by a manual movement on the catch in the direction of arrow C FIG. 4 so as to take lugs out of the recesses 32 and allow the springs to drive the cutter set back towards the FIG. 2 position. At this time, the tool can be rotated around the cable by holding the cable with one hand, and with a finger inserted through the ring 20, turning the tool in the direction of the arrow D FIG. 2. After a single revolution, additional work input can be provided by holding the tool between the finger and thumb of one hand, with the finger going through the ring 20 and the thumb applying pressure at the point 104 FIG. 2: or the springs may drive the blades further into the cable. This continues as far as necessary according to the thickness of the cable and the work necessary to make a series of peripheral cuts through the respective layers. The travel of the parts may take the catch over a ratchet tooth if one is provided, and this may lead to an audible click as an indication of full travel of the actuator. Of course if more than one ratchet tooth is provided there will be a series of clicks and it may be necessary for the operator to count them. In some cases, particularly if the resistance of the cable is such that the cut proceeds slowly, there may be no audible click involved. According to a feature of the invention, a visual indicator of the extent of the cut is also provided. This comprises windows 114 in the sides of the body part 12 enabling side flange 16 and end face 14 (FIG. 6) of the actuator to be seen. When end face 14 abuts the stop face 116 (FIG. 5) in the body part, no further travel is possible. The tool is to be adjusted so that the cut is (just) complete when that abutment occurs, and the windows are aligned with that position so that the fact of contact between the end face and the stop face can be observed. When the cuts are completed the cable is pulled out of the tool leaving the stripped sheaths in the guide from which they can be discharged from time to time for example by being pushed out by the next cable to be treated.

The forces applied in the cutting operation tend to displace the blades away from the cable and hence take up any tolerance in pawl and ratchet (where provided) positions due to the manual input having displaced the actuator to a position midway between two ratchet teeth: when this happens, the resilience of the cable and or the forces applied to the cutter blade when the tool is rotated about the cable quickly return the actuator as far as the ratchet will permit, thus giving a precise control over the depth of cut.

Having now described my invention what I claim is:

1. A tool for stripping a coaxial cable comprising a body having an opening therein; a blade carrier accommodated in said opening for sliding movements along a path relative to said body; a plurality of spaced apart, parallel blades supported by said blade carrier and projecting different distances beyond said carrier; means for supporting a coaxial cable in said body transverse to the path of sliding movement of said blade carrier and in a position to be engaged by said blades in response to movement of said blade carrier in one direction along said path; and ratchet and pawl means reacting between said body and said carrier for releasably latching said carrier in a selected position relative to said body.

2. A tool according to claim 1 including biasing means acting on said ratchet and pawl means and biasing the latter toward its carrier latching position.

3. A tool accoridng to claim 1 including spring means acting on said carrier and urging the latter in said one direction, said ratchet and pawl means being operable to limit the movement of said carrier in said one direction.

4. A tool according to claim 3 wherein said spring means is effective over only a portion of the movement of said carrier in said one direction.

5. A tool according to claim 3 wherein said ratchet and pawl means also is operable to limit movement of said carier in the opposite direction.

6. A tool according to claim 1 wherein said body has an aperture therein through which said carrier is accessible for manual movement thereof.

7. A tool according to claim 4 wherein said aperture is of sufficient extent to enable said carrier to be moved to an extreme position in which said carrier may be removed from said body through said aperture.

8. A tool according to claim 1 wherein said ratchet and pawl means comprises a projection mounted on a catch pivotally mounted on said carrier and a plurality of teeth engageable by said projection, said catch being manually pivotal to overcome the bias of said biasing means and effect disengagement of said projection from said teeth.

9. A tool according to claim 7 including detent means for retaining said carrier supporting means in said extreme position.

10. A tool according to claim 1 wherein said pawl and ratchet means emits an audible sound in response to movement of carrier relative to said body.

11. A tool according to any of the preceding claims wherein said body has a viewing aperture therein through which the position of said carrier may be viewed.

12. A tool according to claim 1 including a cable guide supported by said body for accommodating a cable that is to be shipped.

13. A tool according to claim 12 wherein said cable guide is of such size as to correspond to that of the cable accommodated therein.

14. A tool according to claim 3 wherein said spring means is ineffective when said carrier has been moved in said one direction to a position in which all of said blades may engage a cable.

* * * * *